Patented Aug. 4, 1931

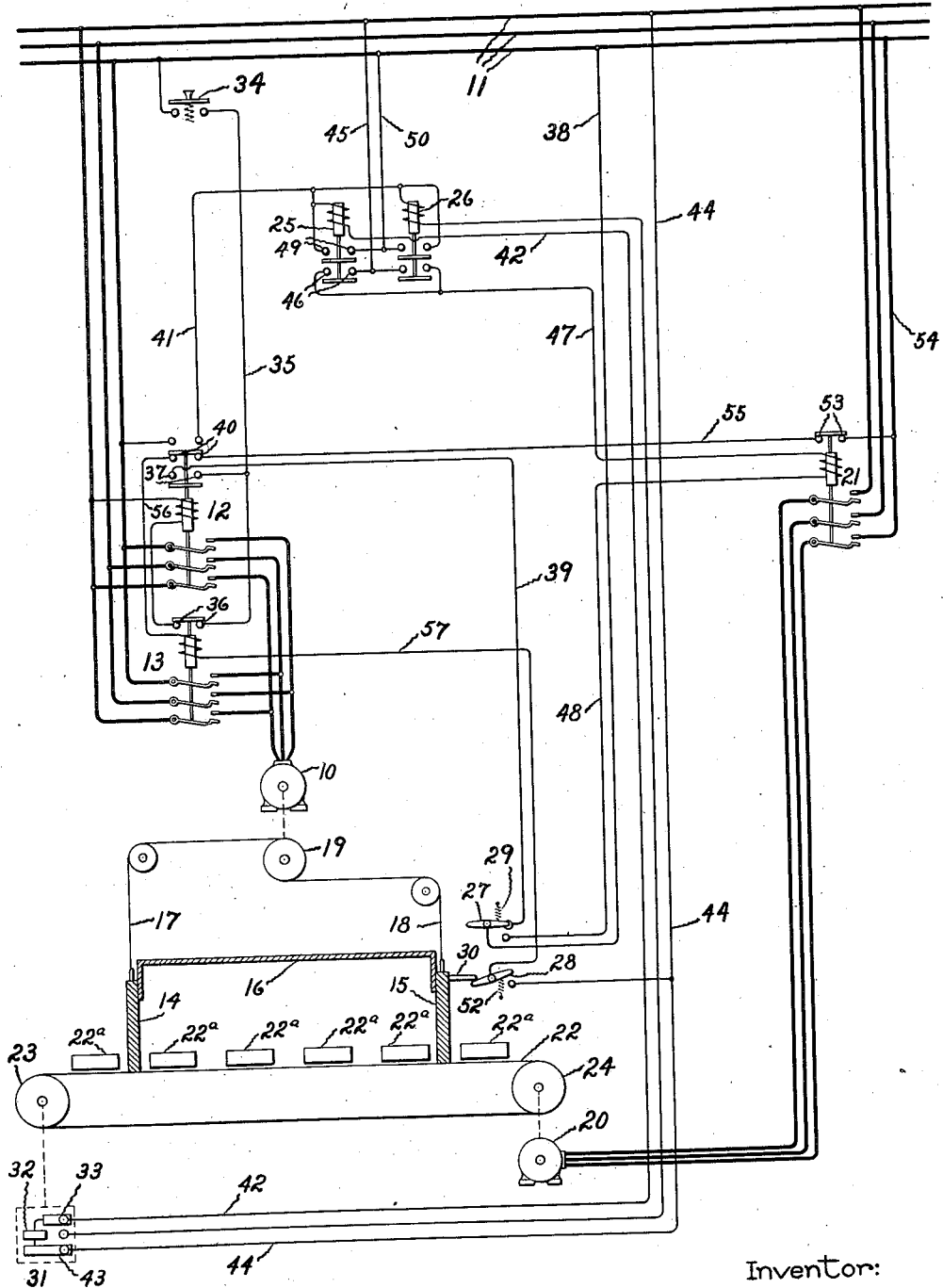

1,817,810

UNITED STATES PATENT OFFICE

ROGER F. EMERSON, OF SCOTIA, NEW YORK, ASSIGNOR TO GENERAL ELECTRIC COMPANY, A CORPORATION OF NEW YORK

MOTOR CONTROL SYSTEM

Application filed April 17, 1929. Serial No. 355,884.

This invention relates to systems for controlling the operation of electric motors, and more particularly it relates to systems in which a plurality of motors are employed to perform given operations in a predetermined sequence during successive operating cycles, and has for an object the provision of an automatic control system in which one of a plurality of motors is required to operate for limited periods both in a forward and in a reverse direction, whilst another motor is required to operate only between the two operations of the first motor and always in the same direction in each cycle.

In carrying my invention into effect in one form thereof, I have shown it as employed in a system for controlling the sequence of operations of the door and conveyor motors of a furnace in which the door motor is controlled to raise the furnace doors to permit the conveyor motor to drive the conveyor belt a limited distance, and then to lower the doors.

For a better and more complete understanding of my invention, reference should be made to the following specification in connection with the accompanying drawing, the single figure of which is a simple diagrammatic representation of apparatus and connections employed in an actual embodiment of my invention.

Referring now to the drawing, an electric motor 10 which may be of any suitable type but which for the purposes of illustration is shown as an alternating current motor, is arranged to be supplied with electrical energy from any suitable source, such as that represented by the three-phase supply lines 11. An "up" contactor 12 when energized and operated to the closed position serves to connect the motor 10 to the supply line 11 for operation in one direction of rotation, whilst a "down" contactor 13 when operated to the closed position provides connections for rotation in the reverse direction.

Inlet and outlet doors 14 and 15, respectively, of a furnace 16 are secured to ropes or cables 17 and 18 wound upon a winding drum 19 which is mounted upon or coupled with the shaft of the motor 10. The connections of the motor with the supply line are so chosen that the rotation of the motor will be in a direction to raise the doors 14 and 15 when the "up" contactor 12 is closed and to lower the doors when the "down" contactor 13 is operated to the closed position.

A second motor 20 represented in the drawing as an alternating current motor is provided for operating a conveyor for moving material into and out of the furnace. The motor 20 is arranged to have its terminals connected with the supply lines 11 through the contacts of contactor 21. As shown in the drawing, an endless conveyor belt 22 serves to support and carry trays 22a laden with material to be treated, into and out of the furnace 16. The endless conveyor belt 22 extends over and about two pulleys 23 and 24, the latter pulley being mounted upon the shaft of motor 20 or connected therewith by any suitable coupling means and serves as the drive pulley for the conveyor belt. Two control relays 25 and 26 are provided for controlling the energization of the conveyor motor contactor 21. Either of these relays when energized and operated to the closed position serves partially to establish an energizing circuit for the coil of contactor 21. Only one of these control relays may be closed at a time. This will be more fully understood from the explanation of the detailed operation below.

Associated with the door 15 of the furnace are two limit switches shown conventionally in the drawing and represented by the numerals 27, 28. The limit switch 27 which will be designated as the top limit switch is normally biased by spring 29 to the position in which it is shown. But when actuated against its bias by the projecting finger 30 mounted on the door 15 the limit switch serves the double function of deenergizing the "up" contactor 12 to stop the door motor, and of completing an energizing circuit for the conveyor motor contactor 21. The top limit switch 27 is so positioned with respect to the door 15 that it will be operated when the doors have been raised an amount sufficient to admit the trays 22a within the furnace. Bottom limit switch 28 functions to deenergize the "down" contactor 13 and stop the door motor 10 when the doors have been lowered to their original position.

A second limit switch 31 is associated with the conveyor and serves to stop the conveyor motor when a desired number of trays containing material have been moved into the furnace. As shown in the drawing, this limit switch is operatively connected with the shaft of the pulley 23, which is driven by the conveyor belt 22. Since it is desirable that all the steps in the cycle of operation shall take place automatically, it is necessary that limit switch 31, after it has functioned to deenergize contactor 21 to stop the conveyor motor, shall partially reset a control circuit for contactor 21 for the next succeeding cycle of operation. To this end, limit switch 31 is of the drum type and is provided with segments 32 and 33 mounted 180° apart on the drum. These segments cooperate with control relays 25 and 26 to control the energization of the conveyor motor contactor 21. All this will be more fully explained in the detailed operation which follows below.

With the above preliminary understanding of the apparatus employed in this invention and of the relation and association of the parts with each other, the operation which will now be described in detail will be readily understood. As shown in the drawing, the parts are all in their normal or prestarting position. Assuming now that it is desired to raise the doors of the furnace to admit a fresh tray of material and to deliver from the furnace a tray of material which has been sufficiently treated, and then again to close the doors, it is only necessary momentarily to depress a switch 34. In its operated position switch 34 which may be of any suitable type but which for purposes of illustration has been shown as a normally open push button, closes an energizing circuit for the "up" contactor 12 that may be traced from the lower supply line 11 to and through the contacts of push button 34, over conductor 35, through normally closed interlocking contacts 36 on "down" contactor 13, coil of "up" contactor 12, to upper supply line 11. "Up" contactor 12 in responding to the energization of its coil moves to the closed position in which its auxiliary contacts 37 are closed to provde a holding circuit independent of push button 34; the holding circuit being traced from the lower supply line 11 over conductor 38, through the normally closed contacts of top limit switch 27, thence over conductor 39 and through auxiliary contacts 37 to the conductor 35, and then through the coil of contactor 12 to upper supply line 11 as before. The push button 34 may now be released and the cycle of operation will proceed automatically from this point. The closing of "up" contactor 12 also results in the closing of its interlocking contacts 40 which results in energizing either of the control relays 25 or 26 depending upon which of the segments 32 and 33 of limit switch 31 has been moved into engagement with its corresponding stationary contact during the preceding cycle. As shown in the drawing, segment 33 has been moved into engagement with its cooperating stationary contact member and, therefore, the control relay 25 will be energized and operated to the closed position, the energizing circuit being traced from lower supply line 11, through inter-locking contacts 40, over conductor 41, to and through the coil of control relay 25, conductor 42, segment 33 of limit switch 31, continuous segment 43, conductor 44, to the top supply line 11. The lower movable contact member of control relay 25 moves upwardly to the closed position in response to the energization of its coil and partially establishes an energizing circuit for the conveyor motor contactor 21, this energizing circuit extending from the top supply line 11, over conductor 45, to lower contacts 46 of relay 25, over conductor 47, to and through the coil of contactor 21, and thence over conductor 48 as far as the normally open contact of top limit switch 27. The control relay 25 is also provided with auxiliary contacts 49 to provide a self-holding circuit independent of interlocking contacts 40 on "up" contactor 12 for the energizing coil when the relay is in its closed position. This self-holding circuit extends from bottom supply line 11, over conductor 50, through upper auxiliary contacts 49, to the coil of the relay and thence over the circuit already traced to the top of supply line 11.

In the closed position of "up" contactor 12, door motor 10 is connected with the source of supply 11 for operation in a direction such as to raise the doors 14 and 15. When the doors have been raised a predetermined distance as determined by the positioning of limit switch 27, projecting member 30 on door 15 actuates limit switch 27 against the bias of its spring 29 to open its normally closed contacts and to close its normally open contact. The opening of the normally closed contact results in de-energizing and opening of the "up" contactor 12 and in the stopping of motor 10, whilst the closing of the normally open contact completes the energizing circuit for the coil of the conveyor motor contactor 21 over conductor 38 to lower supply line 11, which has previously been traced from upper supply line 11 as far as the normally open contact. Conveyor motor contactor 21 in responding to the energization of its coil moves to the closed position, in which position the terminals of conveyor motor 20 are connected with the supply line 11. Conveyor motor 20 then drives the conveyor belt 22 a predetermined limited distance sufficient to admit the desired number of trays into the furnace. When the belt has moved the desired distance, the segment 33 of limit switch 31 will have been rotated 180° from the position in which it is shown in the drawing and will be disengaged from its stationary contact member and will thereby open the holding circuit for control relay 25 to permit this relay to drop to its lower position and to deenergize the contactor 21. In the event that 180° rotation of limit switch 31 does not correspond with the movement of belt 22 necessary to advance the desired number of trays into the furnace, suitable speed reduction mechanism may be provided between the shaft of pulley 23 and the shaft of the limit switch to make these movements correspond. Contactor 21 will then drop to the lower position and open the supply circuit for motor 20. It should be noted that when the segment 33 of limit switch 31 moves out of engagement with its stationary contact member, segment 32 moves into engagement with its stationary contact member thereby partially establishing an energizing circuit for control relay 26 which will enable the inter-locking contact 40 on "up" contactor 12 to complete the energizing circuit for this relay in the next succeeding cycle.

When the door 15 was operated to the open position, it permitted the spring 52 to close normally open limit switch 28. The opening of contact 21 permitted interlock contacts 53 to complete an energizing circuit for "down" contactor 13. This energizing circuit extends from lower supply line 11, over conductor 54, through interlocking contacts 53, conductor 55, to interlock contact 40 in the lower position thereof, conductor 56, through coil of "down" contactor 13, conductor 57, through the contacts of limit switch 28, to conductor 44, and thence to upper supply line 11. "Down" contactor 13 in responding to the energization of its coil moves to the upper or closed position thereby connecting the terminals of door motor 10 with the supply line 11 for operation in the reverse direction of rotation thereby permitting the furnace doors 14 and 15 to move to the lower or closed position in which the projecting member 30 or door 15 actuates bottom limit switch 28 to the open position to deenergize "down" contactor 13 and stop the motor 10. This completes the cycle of operation and the apparatus is left in a reset condition in which it will be enabled to repeat the cycle of operations just described by again depressing the push button 34.

In repeating the cycle, however, it will be observed that because of the operation of limit switch 31 in opening contact 33 and closing contact 32, control relay 26 will be energized by the closing of "up" contactor 12 and will perform the functions previously described for relay 25. Thus it will be seen that the limit switch 31 transfers the control over contactor 21 alternately between the two relays 25 and 26 during successive cycles.

While I have described my invention as embodied in concrete form as represented by particular elements and as operating in a specific manner, I wish to have it understood that the invention is in no wise limited thereto since changes and alterations will readily suggest themselves to those skilled in this art without departing from the spirit of the annexed claims.

What I claim as new and desire to secure by Letters Patent of the United States is:—

1. In combination, a motor arranged for operation in both directions of rotation, a second motor arranged for operation only in one direction of rotation, and interlocking control circuits for said motors for effecting operation of said second motor only between respective operations of said first motor, first in a given direction and then in the reverse direction.

2. In combination, a motor arranged for operation in both directions of rotation, a second motor arranged for operation only in one direction, and interlocking control circuits for effecting cyclic operation of said motors in which operation of said second motor is restricted to the interval between operations of said first motor first in a given direction and then in a reverse direction.

3. In combination, a motor arranged for operation in both directions of rotation, a second motor, means responsive to limited operation of said first motor in one direction for disconnecting said first motor and for connecting said second motor for operation, and means responsive to limited operation of said second motor for disconnecting said second motor and for connecting said first motor for operation in the reverse direction of rotation.

4. In combination, a motor, means for connecting said motor for rotation in a given direction, a second motor and power connecting means therefor, means responsive to limited operation of said first motor for disconnecting said motor and for energizing said power connecting means for operation of said second motor, switching means for connecting said first motor for operation in the reverse direction, and means responsive to limited operation of said second motor for disconnecting said second motor and for energizing said switching means.

5. In combination, a motor arranged for operation in both directions of rotation, a second motor, means responsive to limited operation of said first motor in one direction for disconnecting said first motor and for connecting said second motor for operation, means responsive to limited operation of said second motor for disconnecting said second motor and for connecting said first motor for operation in the reverse direction of rotation, and means responsive to limited operation of said first motor in the reverse direction for disconnecting said first motor.

6. In a system of motor control, a load body and a motor arranged for reciprocating said load body between predetermined limits, a second load body and a motor for driving said second load body in one direction only, and interlocking switch mechanism and control circuits controlled thereby for effecting intermittent movements of said second load body only between respective movements of said first load body first in a given direction and then in the reverse direction..

7. In a system of motor control, a motor and forward and reverse contactors therefor, a second motor and a single contactor therefor, means for controlling the energization of said single contactor including a pair of control relays, a manually operated switch for closing said forward contactor and operating one of said relays, a limit switch for deenergizing said forward contactor after limited operation of said first motor and for closing said single contactor, a second limit switch operable after a limited operation of said second motor for deenergizing said single contactor and closing said reverse contactor and for partially establishing an energizing circuit for the other of said control relays, and a third limit switch operable after a limited operation of said first motor in the reverse direction to stop said first motor.

8. In a system of motor control, a motor and forward and reverse contactors therefor, a second motor and a single contactor therefor, means for controlling the energization of said single contactor including a pair of control relays, a manually operated switch for closing said forward contactor and operating one of said relays, a limit switch for deenergizing said forward contactor after limited operation of said first motor and for closing said single contactor, a second limit switch operable after a limited operation of said second motor for deenergizing said single contactor and closing said reverse contactor and for partially establishing an energizing circuit for the other of said control relays, a third limit switch operable after a limited operation of said first motor in the reverse direction to stop said first motor, and an interlock on said forward contactor for completing the energizing circuit for said other control relay, whereby operation of said second motor is assured only after prior operation of said first motor.

9. In a system of motor control for operating the doors and conveyor of a furnace, a door motor and a conveyor motor, an up contactor and a down contactor for said door motor, a one way contactor for said conveyor motor, a push button for energizing said up contactor to raise said doors, a plurality of control relays for controlling the energization of said conveyor contactor, an up limit switch operable in the raised position of said doors to deenergize said up contactor and complete an energizing circuit for said conveyor motor contactor, a second limit switch operable in response to a limited movement of said conveyor to deenergize one of said control relays to deenergize said conveyor motor contactor and thereby stop said conveyor and partially to establish an energizing circuit for said other control relay, an interlock on said conveyor motor contactor operable in response to the opening of said conveyor motor contactor for energizing said down contactor to cause said door motor to run in a reverse direction and lower said door, and a third limit switch operable in the lowered position of said door for deenergizing said down contactor and to stop said door motor.

10. A system of control for a furnace and the like provided with a door and conveyor comprising in combination, an electric motor for operating said door, a second electric motor for driving said conveyor, normally open electrical control connections for said conveyor motor, means for effecting operation of said door motor in a direction to open said door, means responsive to movement of said door for closing said control connections to start said conveyor motor, means responsive to limited operation of said conveyor for effecting operation of said door motor in the reverse direction to close said door and for interrupting and partially reestablishing said control connections to stop said conveyor motor and to leave said system in a reset condition.

11. A control system for a furnace and the like having a door and a conveyor comprising in combination, an electric motor for operating said door, a second electric motor for driving said conveyor normally open electrical control connections for said conveyor motor, a manually operated device for effecting operation of said door motor in the door opening direction, a limit switch responsive to a predetermined movement of said door for closing said control connections to start said conveyor motor and a second limit switch operable in response to limited operation of said conveyor for effecting operation of said door motor in the door closing direction and for interrupting and partially reestablishing said control connections to stop said conveyor motor and to leave the system in a reset condition.

12. In a motor control system, a motor, forward and reverse contactors for effecting operation of said motor in both directions of rotation, a second motor and a single contactor therefor for effecting operation of said motor in one direction only, means for operating said forward contactor for forward rotation, means responsive to limited rotation for opening said contactor, electromagnetic switching mechanism responsive to the operation of said forward contactor for operating said single contactor for operation of said second motor, limit switch mechanism responsive to limited operation of said second motor for opening said single contactor and closing said reverse contactor for reverse operation of said first motor, and interlocking control circuits under the control of said electromagnetic switching mechanism and said limit switch mechanism for effecting operation of said second motor only after operation of said first motor in the forward direction.

13. In a system of motor control, a motor for hoisting and lowering a load body between predetermined limits, up and down contactors for controlling the hoisting and lowering operation respectively of said motor, a motor for driving a conveyor, a contactor for controlling said conveyor motor, a pair of control relays for controlling the operation of said conveyor motor contactor, the energization of said control relays being under the control of said up contactor, whereby said conveyor motor is restricted to operation after the hoisting operation of said first mentioned motor, manually controlled means for operating said up contactor, a top limit switch operable by said load for deenergizing said up contactor and for cooperating with one of said relays to operate said conveyor motor contactor, a selector limit switch operable in response to movement of said conveyor for deenergizing said one relay and said conveyor motor contactor and for giving the control of said conveyor motor contactor to the other relay, means responsive to the deenergization of said conveyor motor contactor for energizing said down contactor, and a bottom limit switch operable by said load for deenergizing said contactor.

14. In a system of motor control, a motor and forward and reverse contactors therefor, a second motor and a single contactor therefor, a pair of control relays for partially establishing an energizing circuit for said single contactor, manually operated means for energizing said forward contactor and means responsive to the operation of said contactor for energizing one of said control relays, means responsive to limited operation of said first motor for deenergizing said forward contactor and for completing said energizing circuit for said single contactor, a selective limit switch operable after a limited operation of said second motor to deenergize said one control relay to open said single contactor and stop said second motor and to render operable the other of said control relays, means responsive to the opening of said single contactor for closing said reverse contactor and means responsive to limited operation of said second motor in the reverse direction for deenergizing said reverse contactor.

In witness whereof, I have hereunto set my hand this 16th day of April, 1929.

ROGER F. EMERSON.